(12) United States Patent
Halalay et al.

(10) Patent No.: US 10,243,241 B2
(45) Date of Patent: Mar. 26, 2019

(54) LITHIUM ION BATTERY WITH TRANSITION METAL ION TRAPS

(71) Applicant: GM GLOBAL TECHNOLOGY OPERATIONS LLC, Detroit, MI (US)

(72) Inventors: Ion C. Halalay, Grosse Pointe Park, MI (US); Timothy J. Fuller, Pittsford, NY (US); Zicheng Li, Sterling Heights, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 14/956,038

(22) Filed: Dec. 1, 2015

(65) Prior Publication Data

US 2017/0155175 A1    Jun. 1, 2017

(51) Int. Cl.
  *H01M 2/16*    (2006.01)
  *H01M 4/62*    (2006.01)
  (Continued)

(52) U.S. Cl.
  CPC ..... *H01M 10/4235* (2013.01); *H01M 2/1653* (2013.01); *H01M 2/1686* (2013.01);
  (Continued)

(58) Field of Classification Search
  CPC .. H01M 2/1653; H01M 2/1686; H01M 4/622; H01M 10/0567; H01M 10/0525; H01M 10/4235
  (Continued)

(56) References Cited

U.S. PATENT DOCUMENTS

| 4,530,963 | A | * | 7/1985 | DeVoe ............... A23L 2/42 210/615 |
|---|---|---|---|---|
| 4,670,363 | A | | 6/1987 | Whitney et al. |

(Continued)

FOREIGN PATENT DOCUMENTS

| CN | 102130361 A | 7/2011 |
|---|---|---|
| CN | 102447111 A | 5/2012 |

(Continued)

OTHER PUBLICATIONS

Wikipedia contributors. "Ionophore." Wikipedia, The Free Encyclopedia. Wikipedia, The Free Encyclopedia, Aug. 30, 2012. Web. Mar. 20, 2018. (Year: 2012).*

(Continued)

*Primary Examiner* — Sean P Cullen

(57) ABSTRACT

A lithium ion battery is provided that includes: a positive electrode; a negative electrode; a microporous polymer separator soaked in an electrolyte solution, the microporous polymer separator disposed between the positive electrode and the negative electrode; and a transition metal cation trap which is i) incorporated as a binder in any of the positive electrode or the negative electrode, ii) deposited onto a surface of any of the positive electrode or the negative electrode, iii) incorporated into the microporous polymer separator, iv) deposited onto a surface of the microporous polymer separator, or v) included as an additive in the electrolyte solution. The transition metal cation trap is a siderophore.

10 Claims, 5 Drawing Sheets

(51) Int. Cl.
*H01M 10/42* (2006.01)
*H01M 10/0525* (2010.01)
*H01M 10/0567* (2010.01)

(52) U.S. Cl.
CPC ....... *H01M 4/622* (2013.01); *H01M 10/0525* (2013.01); *H01M 10/0567* (2013.01)

(58) Field of Classification Search
USPC .................................. 429/188, 306, 307
See application file for complete search history.

(56) References Cited

U.S. PATENT DOCUMENTS

| | | | |
|---|---|---|---|
| 5,130,211 A | 7/1992 | Wilkinson | |
| 6,689,513 B1 | 2/2004 | Morigaki et al. | |
| 7,022,812 B2 | 4/2006 | Yoshimura et al. | |
| 7,282,109 B2 | 10/2007 | Takata et al. | |
| 8,349,031 B2 | 1/2013 | Take et al. | |
| 8,455,140 B1 | 6/2013 | Huang et al. | |
| 8,460,591 B2 | 6/2013 | Huang et al. | |
| 8,460,829 B1 | 6/2013 | Huang et al. | |
| 8,470,468 B2 | 6/2013 | Xiao et al. | |
| 8,470,898 B2 | 6/2013 | Huang | |
| 8,568,930 B2 | 10/2013 | Halalay et al. | |
| 8,663,840 B2 | 3/2014 | Nazri et al. | |
| 8,765,301 B2 | 7/2014 | Halalay et al. | |
| 8,785,054 B2 | 7/2014 | Halalay et al. | |
| 8,835,058 B2 | 9/2014 | Kia et al. | |
| 8,951,654 B2 | 2/2015 | Sachdev et al. | |
| 8,974,946 B2 | 3/2015 | Cal et al. | |
| 8,993,646 B2 | 3/2015 | Huang | |
| 8,999,584 B2 | 4/2015 | Jiang et al. | |
| 9,023,520 B2 | 5/2015 | Halalay et al. | |
| 9,028,565 B2 | 5/2015 | Huang | |
| 9,077,038 B2 | 7/2015 | Halalay et al. | |
| 9,093,705 B2 | 7/2015 | Xiao et al. | |
| 9,123,939 B2 | 9/2015 | Xiao et al. | |
| 9,130,231 B2 | 9/2015 | Halalay et al. | |
| 9,138,932 B2 | 9/2015 | Huang | |
| 9,142,830 B2 | 9/2015 | Xiao et al. | |
| 9,153,819 B2 | 10/2015 | Huang et al. | |
| 9,160,036 B2 | 10/2015 | Yang et al. | |
| 9,172,075 B2 | 10/2015 | Kia et al. | |
| 9,324,984 B2 | 4/2016 | Huang et al. | |
| 9,331,323 B2 | 5/2016 | Huang | |
| 9,346,066 B2 | 5/2016 | Huang | |
| 9,350,046 B2 | 5/2016 | Huang | |
| 9,362,542 B2 | 6/2016 | Halalay et al. | |
| 9,362,551 B2 | 6/2016 | Sachdev et al. | |
| 9,362,552 B2 | 6/2016 | Sohn et al. | |
| 9,412,986 B2 | 8/2016 | Huang | |
| 9,455,430 B2 | 9/2016 | Huang et al. | |
| 9,525,600 B1 | 12/2016 | Shen | |
| 9,537,144 B2 | 1/2017 | Huang et al. | |
| 2006/0194118 A1* | 8/2006 | Yew ................ | H01M 6/168 429/326 |
| 2010/0143769 A1 | 6/2010 | Lee et al. | |
| 2010/0239900 A1 | 9/2010 | Take et al. | |
| 2011/0117413 A1 | 5/2011 | Wang et al. | |
| 2011/0151333 A1 | 6/2011 | Halalay et al. | |
| 2011/0165459 A1 | 7/2011 | Halalay et al. | |
| 2011/0200863 A1 | 8/2011 | Xiao et al. | |
| 2011/0236762 A1 | 9/2011 | Huang et al. | |
| 2012/0102725 A1 | 5/2012 | Fuller et al. | |
| 2012/0156568 A1 | 6/2012 | Kia et al. | |
| 2012/0156569 A1 | 6/2012 | Kia et al. | |
| 2012/0229096 A1 | 9/2012 | Nazri | |
| 2012/0231321 A1 | 9/2012 | Huang et al. | |
| 2012/0308872 A1 | 12/2012 | Huang | |
| 2012/0309860 A1 | 12/2012 | Huang | |
| 2012/0315384 A1 | 12/2012 | Abd Elhamid et al. | |
| 2013/0004857 A1 | 1/2013 | Kia et al. | |
| 2013/0052509 A1 | 2/2013 | Halalay et al. | |
| 2013/0071742 A1* | 3/2013 | Halalay ................ | H01M 4/602 429/213 |
| 2013/0115519 A1 | 5/2013 | Lee et al. | |
| 2013/0130093 A1 | 5/2013 | Wang et al. | |
| 2013/0131200 A1 | 5/2013 | Huang | |
| 2013/0183582 A1 | 7/2013 | Halalay et al. | |
| 2013/0284338 A1 | 10/2013 | Xiao et al. | |
| 2013/0319599 A1 | 12/2013 | Huang | |
| 2014/0220233 A1 | 8/2014 | Huang et al. | |
| 2014/0242452 A1 | 8/2014 | Pieczonka et al. | |
| 2014/0272526 A1 | 9/2014 | Huang | |
| 2014/0272558 A1 | 9/2014 | Xiao et al. | |
| 2015/0014890 A1 | 1/2015 | Xiao | |
| 2015/0037651 A1 | 2/2015 | Huang | |
| 2015/0056492 A1 | 2/2015 | Huang | |
| 2015/0093626 A1 | 4/2015 | Fuller et al. | |
| 2015/0093628 A1* | 4/2015 | Halalay ............... | H01M 2/1686 429/145 |
| 2015/0093639 A1 | 4/2015 | Halalay et al. | |
| 2016/0111721 A1 | 4/2016 | Xiao et al. | |
| 2017/0155175 A1 | 6/2017 | Halalay et al. | |

FOREIGN PATENT DOCUMENTS

| | | | |
|---|---|---|---|
| CN | 102668171 A | 9/2012 | |
| CN | 104518190 A | 4/2015 | |
| CN | 106816626 A | 6/2017 | |
| DE | 102013218681 A1 * | 3/2015 | .............. H01M 2/34 |
| DE | 102014113894 A1 | 4/2015 | |
| DE | 102016122403 A1 | 6/2017 | |
| JP | S59031571 A | 2/1984 | |
| WO | WO-2017120884 A1 | 7/2017 | |

OTHER PUBLICATIONS

Wikipedia contributors. "Siderophore." Wikipedia, The Free Encyclopedia. Wikipedia, The Free Encyclopedia, Aug. 16, 2012. Web. Mar. 20, 2018. (Year: 2012).*

Walkowiak, et al., Macrocycle Carriers for Separation of Metal Ions In Liquid Membrane Process—A Review, Desalination 240, 1999, pp. 186-197.

Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.

Shahrisa, et al., CHemistry of Pyrones, Part 3: New Podands of 4H-Pyran-4-ones; 5 Molecules, 2000, pp. 200-207.

Atwood, et al., Cation Complexation by Calizarenes; Cation Binding by Macrocycles, 1990, Chapter 15, pp. 581-582, 587; Marcel Dekker Inc., New York and Basel.

Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Arora, et al., Battery Separators, Chem. Rev. 104, 2004, pp. 4419-4462.

Babb, D. A., "Synthesis and Metal Ion Complexation of Synthetic Ionophores," A Ph.D. Dissertation in Chemistry, Texas Tech University, Dec. 1985, 149 pages.

Manecke, G., et al., "Polymere Kryptanden, 1", Makromol. Chem. 182, 1973-1984, (1981).

Kopolow, S., et al., "Poly(vinyl macrocyclic polyethers). Synthesis and Cation Binding Properties", vol. 6, No. 1, Jan.-Feb. 1973, pp. 133-142.

Smid, J., et al., "Synthesis of 4'-Vinylbenzocrown Ethers", Organic Preparations and Procedures Int. 8(4), 1976, pp. 193-196.

Banerjee, et al.; "Review—Multifunctional Materials for Enhanced Li-Ion Batteries Durability: A Brief Review of Practical Options"; Journal of the Electrochemical Society, 164 (1); Jan. 5, 2017; pp. A6315-A6323.

(56) References Cited

OTHER PUBLICATIONS

Ziv, et al. "Manganese Sequestration and Li-Ion Batteries Durability Enhancement by Polymeric 18-Crown-6 Ethers"; Journal of the Electrochemical Society, 161 (9); May 21, 2014; pp. A1213-A1217.

Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekkerinc., New York and Basel.

Kaifer, et al., Redox Control of Cation Binding in Macrocyclic Systems; Cation Binding by Macrocycles, 1990, Chapert 8, p. 364, Marcel Dekker Inc., New York and Basel.

"Teijin Develops More Heat-Resistant Li-Ion Battery Separator", Trading Markets.Com, Sep. 10, 2009, 3 pages, http://www.tradingmarkets.com.

Plastics Today Staff, "TonenGeneral and Toray team up to create lithium-ion battery separator films", plasticstoday.com, Nov. 4, 2009, 2 pages, http://www.plasticstoday.com.

Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.

Anjan Banerjee et al.; "Increasing the durability of Li-ion batteries by means of manganese ion trapping materials with nitrogen functionalities"; Journal of Power Sources 341 (2017); pp. 457-465.

Anjan Banerjee et al.; "Multifunctional Manganese Ions Trapping and Hydrofluoric Acid Scavenging Separator for Lithium Ion Batteries Based on Poly (ethylene-alternate-maleic acid) Dilithium Salt"; Advanced Energy Materials; 2016; 9 pages.

Halalay et al.; U.S. Appl. No. 15/644,436, filed Jul. 7, 2017 entitled "Iron Ion Trapping Van Der Waals Gripper Additives For Electrolyte Systems In Lithium-Ion Batteries"; 54 pages.

Luski et al.; U.S. Appl. No. 15/186,526, filed Jun. 19, 2016 entitled "Lithium Ion Battery"; 74 pages.

Luski et al.; U.S. Appl. No. 15/186,525, filed Jun. 19, 2016 entitled "Lithium Ion Battery"; 65 pages.

Wu et al.; U.S. Appl. No. 15/644,444, filed Jul. 7, 2017 entitled "Electrolyte System Suppressing Or Minimizing Metal Contaminants And Dendrite Formation In Lithium Ion Batteries"; 45 pages.

Halalay et al.; U.S. Appl. No. 15/644,422, filed Jul. 7, 2017 entitled "Polymeric Ion Traps For Suppressing Or Minimizing Transition Metal Ions And Dendrite Formation Or Growth In Lithium-Ion Batteries"; 43 pages.

\* cited by examiner

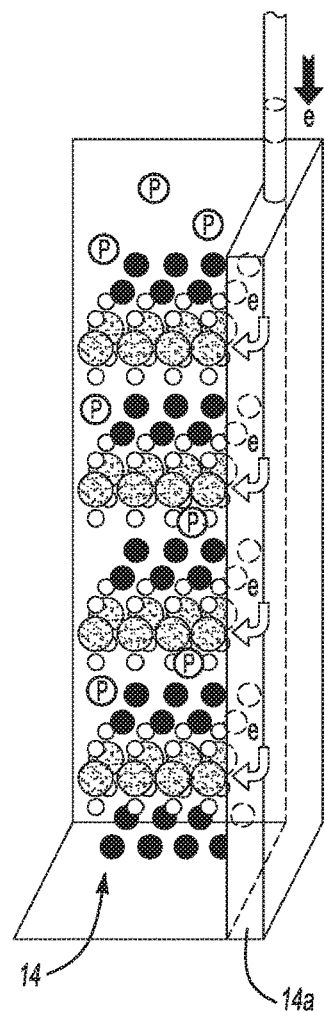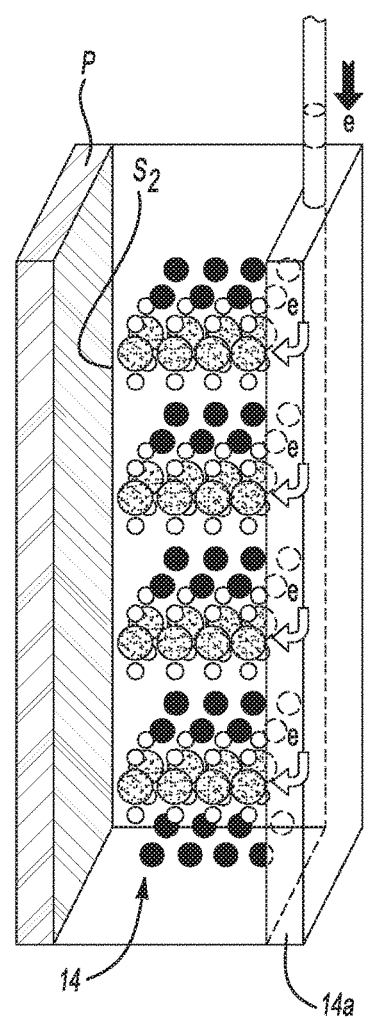
Fig-4A
Fig-4B

US 10,243,241 B2

LITHIUM ION BATTERY WITH TRANSITION METAL ION TRAPS

TECHNICAL FIELD

The present disclosure relates generally to a lithium ion battery with transition metal ion traps.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

A lithium ion battery is provided that includes: a positive electrode; a negative electrode; a microporous polymer separator soaked in an electrolyte solution, the microporous polymer separator disposed between the positive electrode and the negative electrode; and a transition metal cation trap which is i) incorporated as a binder in any of the positive electrode or the negative electrode, ii) deposited onto a surface of any of the positive electrode or the negative electrode, iii) incorporated into the microporous polymer separator, iv) deposited onto a surface of the microporous polymer separator, or v) included as an additive in the electrolyte solution. The transition metal cation trap is a siderophore.

BRIEF DESCRIPTION OF THE DRAWINGS

Features of examples of the present disclosure will become apparent by reference to the following detailed description and drawings, in which like reference characters correspond to similar, though perhaps not identical, components. For the sake of brevity, reference characters or features having a previously described function may or may not be described in connection with other drawings in which they appear.

FIG. 4A schematically illustrates an example of a positive electrode for a lithium ion battery including the ion trap additive incorporated therein; and FIG. 4B schematically illustrates another example of the positive electrode including the ion trap additive applied to a surface of the electrode.

DETAILED DESCRIPTION

Figure 1:
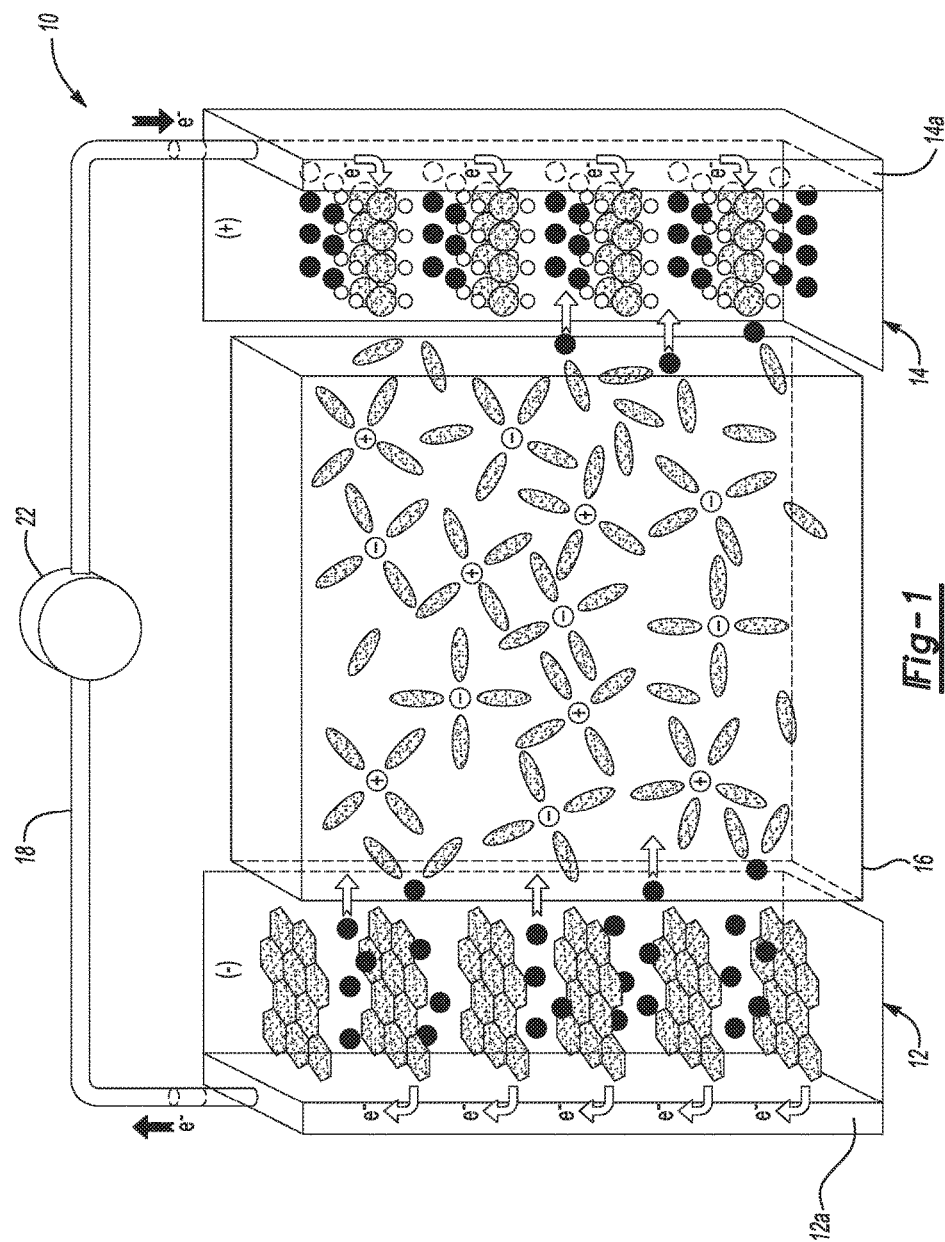
FIG. 1 is a schematic, perspective view of an example of a lithium ion battery during a discharging state, where the electrolyte includes a material as an ion trap additive that traps transition metal (TM) cations that leach from the positive electrode and prevents their migration to the negative electrode.

A lithium ion battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in an aprotic non-aqueous solvent.

It has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning." In one example, a graphite electrode is poisoned by $Mn^{+2}$, $Mn^{+3}$, or $Mn^{+4}$ cations that dissolve from spinel $Li_xMn_2O_4$ of the positive electrode. For instance, the $Mn^{+2}$ cations may migrate through the battery electrolyte, and deposit onto the graphite electrode. When deposited onto the graphite, the $Mn^{+2}$ cations become Mn metal. It has been shown that a relatively small amount (e.g., 90 ppm) of Mn metal can poison the graphite electrode and prevent reversible electrode operation, thereby deleteriously affecting the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge-discharge cycling). Moreover, iron dendrites are known to form in lithium ion batteries and result in electrical shorts.

The poisoning of the lithium ion battery by transition metals dissolving from the positive electrode may be reduced or prevented by using examples as disclosed herein of a novel transition metal (TM) ion trap. The TM ion trap, alone or tethered to a polymer, traps transition metal cations, such as Mn cations that leach from the positive electrode of the lithium ion battery, and thereby prevents their migration to the negative electrode and the associated battery performance degradation. Any transition metal cation may be trapped by the TM ion trap, including, for example, cations of iron (e.g., $Fe^{2+}$, $Fe^{3+}$), chromium (e.g., $Cr^{2+}$, $Cr^{3+}$), cobalt (e.g., $Co^{2+}$, $Co^{3+}$), nickel (e.g., $Ni^{2+}$, $Ni^{3+}$, $Ni^{4+}$), or vanadium (e.g., $V^{3+}$, $V^{5+}$). Disclosed herein are examples of the lithium ion battery and the TM ion trap, alone or tethered to a polymer (referred to herein as a "TM chelating polymer"), which can be incorporated in the electrolyte and/or into or onto the electrode(s) of the lithium ion battery and/or into or onto the microporous polymer separator of the lithium ion battery. Each of these examples will be described in reference to one or more of FIGS. 1 through 3B.

Lithium Ion Battery

Referring now to FIG. 1, an example of a lithium ion battery 10 is illustrated. The lithium ion battery 10 generally includes a negative electrode 12, a negative-side current collector 12a, a positive electrode 14, a positive-side current collector 14a, and a microporous polymer separator 16 disposed between the negative electrode 12 and the positive electrode 14. An interruptible external circuit 18 connects the negative electrode 12 and the positive electrode 14. Each of the negative electrode 12, the positive electrode 14, and the microporous polymer separator 16 are soaked in an electrolyte solution capable of conducting lithium ions.

The negative-side current collector 12a and the positive-side current collector 14a may be positioned in contact with the negative electrode 12 and the positive electrode 14, respectively, to collect and move free electrons to and from the external circuit 18.

The lithium ion battery 10 may support a load device 22 that can be operatively connected to the external circuit 18. The load device 22 may be powered fully or partially by the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be a power-generating apparatus that charges the lithium ion battery 10 for purposes of storing energy. For instance, the tendency of windmills and solar panels to variably and/or intermittently generate electricity often results in a need to store surplus energy for later use.

The lithium ion battery 10 can include a wide range of other components that, while not depicted here, are nonetheless known to skilled artisans. For instance, the lithium ion battery 10 may include a casing, gaskets, terminals, tabs, and any other desirable components or materials that may be situated between or around the negative electrode 12 and the positive electrode 14 for performance-related or other practical purposes. Moreover, the size and shape of the lithium ion battery 10, as well as the design and chemical make-up of its main components, may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10 may also be connected in series and/or in parallel with other similar lithium ion batteries to produce a greater voltage output and current (if arranged in parallel) or voltage (if arranged in series) if the load device 22 so requires.

The lithium ion battery 10 can generate a useful electric current during battery discharge by way of reversible electrochemical reactions that occur when the external circuit 18 is closed to connect the negative electrode 12 and the positive electrode 14 at a time when the negative electrode 12 contains a sufficiently higher relative quantity of intercalated lithium. The chemical potential difference between the positive electrode 14 and the negative electrode 12 (ranging from approximately 2.0 volts to 5.0 volts, depending on the exact chemical make-up of the electrodes 12, 14) drives electrons produced by the oxidation of intercalated lithium at the negative electrode 12 through the external circuit 18 towards the positive electrode 14. Lithium ions, which are also produced at the negative electrode 12, are concurrently carried by the electrolyte solution through the microporous polymer separator 16 and towards the positive electrode 14. The electrons flowing through the external circuit 18 and the lithium ions migrating across the microporous polymer separator 16 in the electrolyte solution eventually reconcile and form intercalated lithium at the positive electrode 14. The electric current passing through the external circuit 18 can be harnessed and directed through the load device 22 until the level of intercalated lithium in the negative electrode 12 falls below a workable level or the need for electrical energy ceases.

The lithium ion battery 10 can be charged or re-powered at any time after a partial or full discharge of its available capacity by applying an external battery charger to the lithium ion battery 10 to reverse the electrochemical reactions that occur during battery discharge. The connection of an external battery charger to the lithium ion battery 10 compels the otherwise non-spontaneous oxidation of lithium transition metal oxide or phosphate at the positive electrode 14 to produce electrons and release lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle.

The external battery charger that may be used to charge the lithium ion battery 10 may vary depending on the size, construction, and particular end-use of the lithium ion battery 10. Some suitable external battery chargers include a battery charger plugged into an AC wall outlet and a motor vehicle alternator.

The lithium ion battery 10 generally operates by reversibly passing lithium ions between the negative electrode 12 and the positive electrode 14. In the fully charged state, the voltage of the battery 10 is at a maximum (typically in the range 2.0V to 5.0V); while in the fully discharged state, the voltage of the battery 10 is at a minimum (typically in the range 0V to 2.0V). Essentially, the Fermi energy levels of the active materials in the positive and negative electrodes 14, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the negative electrode 12 of the lithium ion battery 10 contains a high concentration of intercalated lithium while the positive electrode 14 is relatively depleted. When the negative electrode 12 contains a sufficiently higher relative quantity of intercalated lithium, the lithium ion battery 10 can generate a beneficial electric current by way of the previously described reversible electrochemical reactions that occur when the external circuit 18 is closed to connect the negative electrode 12 and the positive electrode 14. The establishment of the closed external circuit under such circumstances causes the extraction of intercalated lithium from the negative electrode 12. The extracted lithium atoms are split into lithium ions (identified by the black dots and by the open circles having a (+) charge) and electrons (e⁻) as they leave an intercalation host at the negative electrode-electrolyte interface.

The negative electrode 12 may include any lithium host active material that can sufficiently undergo lithium intercalation and deintercalation while a suitable current collector 12a is functioning as the negative terminal of the lithium ion battery 10. The negative electrode 12 may also include a polymer binder material to structurally hold the lithium host material together. For example, the negative electrode 12 may be formed of an active material, made from graphite or a low surface area amorphous carbon, intermingled with a binder, made from polyvinylidene fluoride (PVdF), an ethylene propylene diene monomer (EPDM) rubber, or carboxymethyl cellulose (CMC). These materials may be mixed with a high surface area carbon, such as acetylene black, or other conductive filler to ensure electron conduction between the current collector 12a and the active material particles of the negative electrode 12. Graphite is widely utilized to form the negative electrode 12 because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.). Other materials can also be used to form the negative electrode 12 including, for example, lithium titanate, silicon or silicon-carbon composites, and tin oxide.

Adjacent to the negative electrode 12 is the negative-side current collector 12a, which may be formed from copper or any other appropriate electrically conductive material known to skilled artisans.

The positive electrode 14 may be formed from any lithium-based active material that can sufficiently undergo lithium intercalation and deintercalation while a suitable current collector 14a is functioning as the positive terminal of the lithium ion battery 10. The positive electrode 14 may also include a polymer binder material to structurally hold the lithium-based active material together. Examples of the polymer binder include polyvinylidene fluoride (PVdF), an ethylene propylene diene monomer (EPDM) rubber, or carboxymethyl cellulose (CMC). In various examples, the positive electrode 14 may include an active material intermingled with the polymer binder and mixed with a high surface area carbon, such as acetylene black, or other conductive filler to ensure electron conduction between the current collector 14a and the active material particles of the positive electrode 14.

One common class of known materials that can be used to form the active material of the positive electrode 14 is layered lithium transitional metal oxides. Examples of the active material include at least one of spinel lithium manganese oxide ($LiMn_2O_4$), lithium cobalt oxide ($LiCoO_2$), a manganese-nickel oxide spinel [$Li(Mn_{1.5}Ni_{0.5})O_2$], a layered nickel-manganese-cobalt oxide [$Li(Ni_{1-x}Mn_{1-y}Co_{x+y})O_2$], $LiNiO_2$, $Li_2MSiO_4$ (M=Co, Fe, Mn), a lithium iron polyanion oxide, such as lithium iron phosphate ($LiFePO_4$) or lithium iron fluorophosphate ($Li_2FePO_4F$), or a lithium rich layer-structure cathode, such as $xLi_2MnO_3$-(1-x)$LiMO_2$ (M is composed of any ratio of Ni, Mn, and Co). Other lithium-based active materials may also be utilized, such as $LiNi_{1-x}Co_{1-y}M_{x+y}O_2$, $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, M composed of any ratio of Al, Ti, Cr, and/or Mg), lithium vanadium oxide ($LiV_2O_5$), $Li_2MSiO_4$ (M is composed of any ratio of Co, Fe, and/or Mn), $xLi_2MnO_3$-(1-x)$LiMO_2$ (M is composed of any ratio of Ni, Mn and/or Co), and any other high energy nickel-manganese-cobalt material (HE-NMC). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom. Other lithium-based active materials may also be utilized besides those just mentioned. Examples of those alternative materials include lithium nickel-cobalt oxide ($LiNi_xCo_{1-x}O_2$), and aluminum stabilized lithium manganese oxide spinel ($Li_xMn_{2-x}Al_yO_4$).

Adjacent to the positive electrode 14 is the positive-side current collector 14a, which may be formed from aluminum or any other appropriate electrically conductive material known to skilled artisans.

The microporous polymer separator 16 (which may also be referred to herein as simply the separator 16 or the polymer separator 16), which operates as both an electrical insulator and a mechanical support, is sandwiched between the negative electrode 12 and the positive electrode 14 to prevent physical contact between the two electrodes 12, 14 and the occurrence of a short circuit. The separator 16, in addition to providing a physical barrier between the two electrodes 12, 14, ensures passage of lithium ions (identified by the black dots and by the open circles having a (+) charge in FIG. 1) and related anions (identified by the open circles having a (−) charge in FIG. 1) through an electrolyte solution filling its pores.

The microporous polymer separator 16 includes, or in some examples is, a membrane, and this membrane may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available polyolefin microporous polymer separators 16 include CELGARD® 2500 (a monolayer polypropylene separator) and CELGARD® 2320 (a trilayer polypropylene/polyethylene/polypropylene separator) available from Celgard LLC. Some other commercially available separators are available from Entek International, Asahi-Kasei Corporation, Toray Industries, and SK Energy.

In another example, the membrane of the microporous polymer separator 16 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polytetrafluoroethylene (PTFE), polyvinylidene fluoride copolymers and terpolymers, polyvinylfluoride, liquid crystalline polymers (e.g., VECTRAN™ (Hoechst AG, Germany) and ZENITE® (DuPont, Wilmington, Del.)), polyamides, polyphenylene oxide, and/or combinations thereof. It is believed that another example of a liquid crystalline polymer that may be used for the membrane of the separator 16 is poly(p-hydroxybenzoic acid). In yet another example, the membrane may be a combination of one of these polymers and a polyolefin (such as PE and/or PP).

In yet another example, the membrane of the microporous separator 16 may be chosen from a combination of the polyolefin (such as PE and/or PP) and one or more of the polymers for the separator 16 listed above.

The microporous polymer separator 16 may contain a single layer or a multi-layer laminate fabricated from either a dry or wet process, by solvent casting, by a non-woven fiber laying process, or by any other process for making a microporous polymer membrane with properties suitable for application in Li-ion batteries. For example, in one example, a single layer of the polyolefin may constitute the entirety of the microporous polymer separator 16 membrane. In another example, a single layer of one or a combination of any of the polymers from which the microporous polymer separator 16 may be formed (e.g., the polyolefin and/or one or more of the other polymers listed above for the separator 16) may constitute the entirety of the separator 16. As another example, however, multiple discrete layers of similar or dissimilar polyolefins and/or polymers for the separator 16 may be assembled into the microporous polymer separator 16. In one example, a discrete layer of one or more of the polymers may be coated on a discrete layer of the polyolefin for the separator 16. Further, the polyolefin (and/or other polymer) layer, and any other optional polymer layers, may further be included in the microporous polymer separator 16 as a fibrous layer to help provide the microporous polymer separator 16 with appropriate structural and porosity characteristics. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

Still other suitable polymer separators 16 include those that have a ceramic layer attached thereto, and those that have ceramic filler in the polymer matrix (i.e., an organic-inorganic composite matrix).

Each of the negative electrode 12, the positive electrode 14, and the porous separator 16 are soaked in the electrolyte solution. It is to be understood that any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10, as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(CF_3SO_2)_2$ (LiTFSI), $LiN(FSO_2)_2$ (LiFSI), $LiAsF_6$, $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The electrolyte solution may also include a number of additives, such as solvents and/or salts that are minor components of the solution. Example additives include lithium bis(oxalato borate) (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, thiophene, 3,4-ethylenedioxythiophene, 2,5-dihydrofuran, trishexafluoro-iso-propylphosphate, trihydroxybenzene, tetramethoxytitanium, etc. While some examples have been given herein, it is to be understood that other additives could be used. When included, additives may make up from about 0.05% to about 5% of the composition of the electrolyte solution.

Polymer electrolytes, ionic liquids, and melt electrolytes (a.k.a. deep eutectic electrolytes) can also be used. However, these materials, if used in their neat form, may exhibit certain properties that could present challenges. These properties include low conductivity at sub-ambient temperatures, high viscosity, and poor wetting of electrodes.

In addition to the foregoing additives, and in accordance with the teachings herein, natural product materials (and/or modifications thereof or their completely synthetic analogs) may be used as additives (in the electrolyte) to trap transition metal cations that leach from the positive electrode 14 of Li-ion batteries 10, and thereby prevent their migration to the negative electrode 12 and the associated battery performance degradation. These additives (i.e., transition metal ion traps) are also known as siderophores. The various forms that the transition metal ion traps may take include:

natural product materials made by bacteria;
chemically modified natural product materials (to change their processing properties, improve compatibility within the battery, etc.); or
entirely synthetic analogs of natural product materials (which have the same basic functionalities, but perhaps tailored for a specific application).

In an example, the natural product materials are produced by bacteria found in nature. Many such bacteria useful in the practice of the teachings herein may be derived from waste water. The bacteria employed herein are based on derivatives of 2,3-dihydroxybenzoic acid (2,3-DHBA) and serve to trap transition metal cations. These structures tend to fold in on themselves, like a clam shell structure, to trap the cations.

An example of such an additive is enterobactin, a chemical produced by the *Escheria coli* bacteria, which has a stability constant 27 orders of magnitude higher than ethylenediamine for complexes formed with $Fe^{3+}$ ions. It is to be noted that the radius of the $Fe^{3+}$ ion is identical to the radius of $Mn^{4+}$, which appears as one of the prevalent Mn species leached from the positive electrode 14 into the Li-ion battery electrolyte. Thus, the stability constant for enterobactin is expected to be essentially the same for $Mn^{4+}$ and other similarly sized cations as it is for $Fe^{3+}$.

Examples of some naturally occurring transition metal cation traps (including enterobactin) based on 2,3-DHBA are shown below:

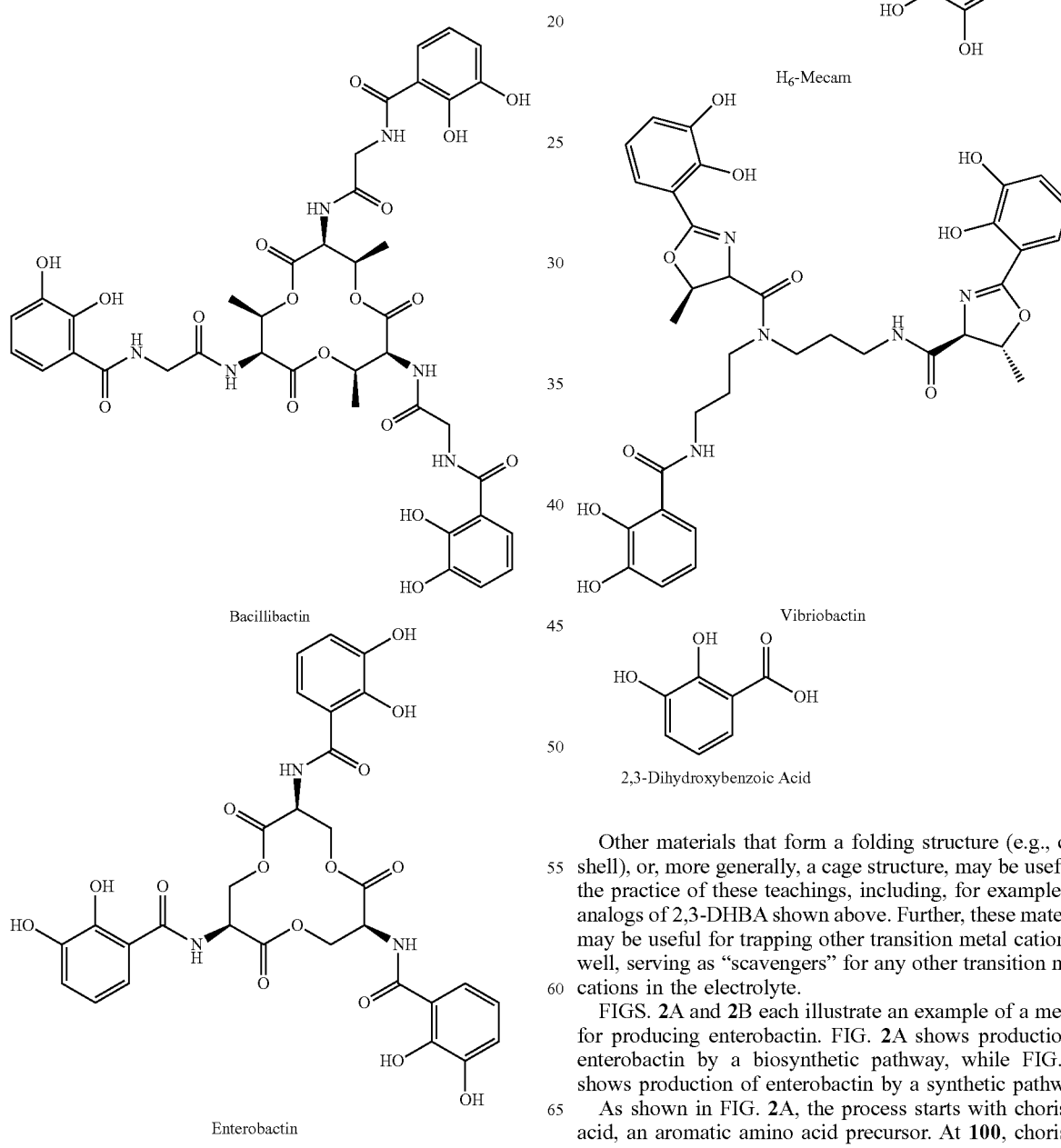

Other materials that form a folding structure (e.g., clam shell), or, more generally, a cage structure, may be useful in the practice of these teachings, including, for example, the analogs of 2,3-DHBA shown above. Further, these materials may be useful for trapping other transition metal cations as well, serving as "scavengers" for any other transition metal cations in the electrolyte.

Figure 2A:
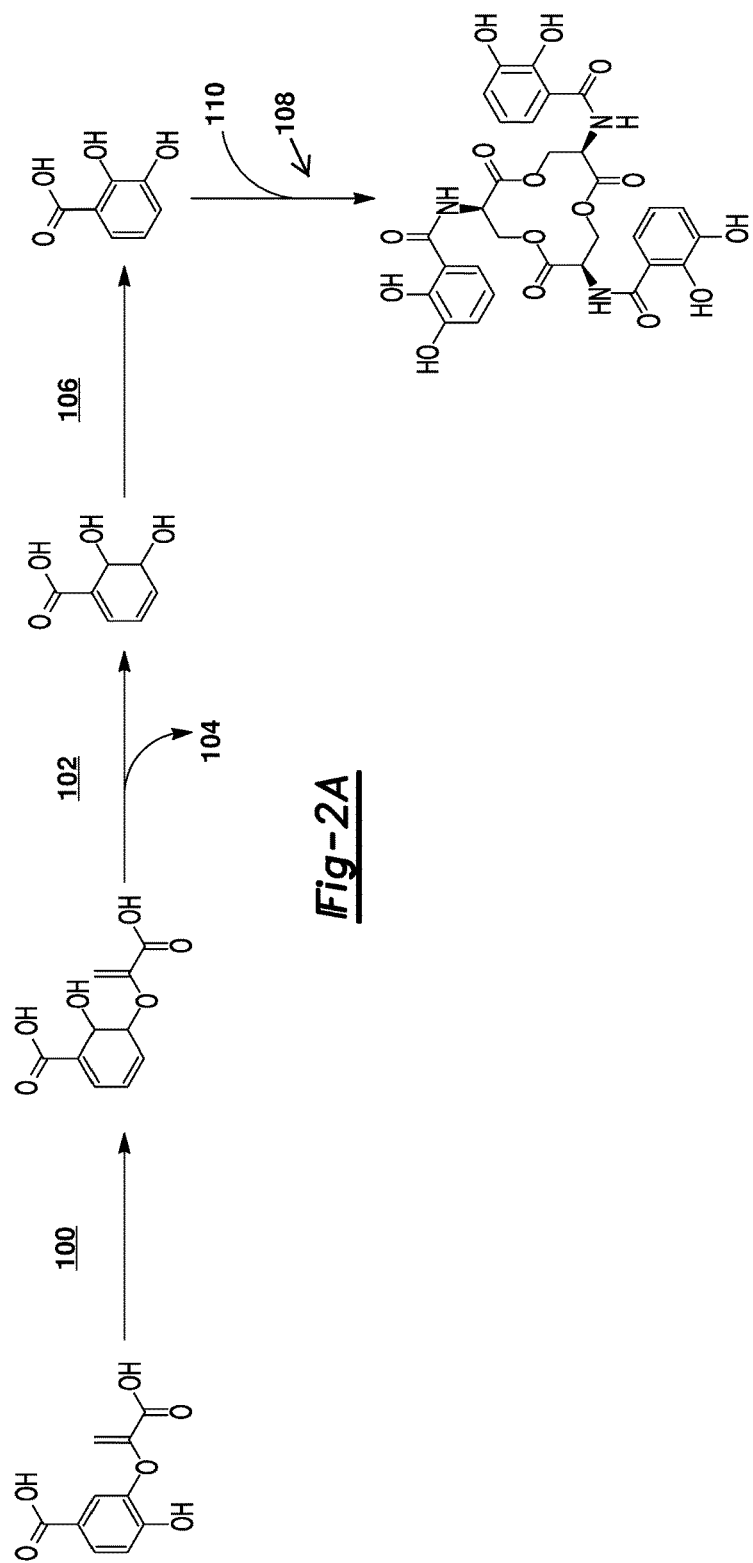
FIG. 2A depicts an example of a reaction scheme for fabricating the TM ion trap additive, employing a biosynthetic pathway.
Figure 2B:
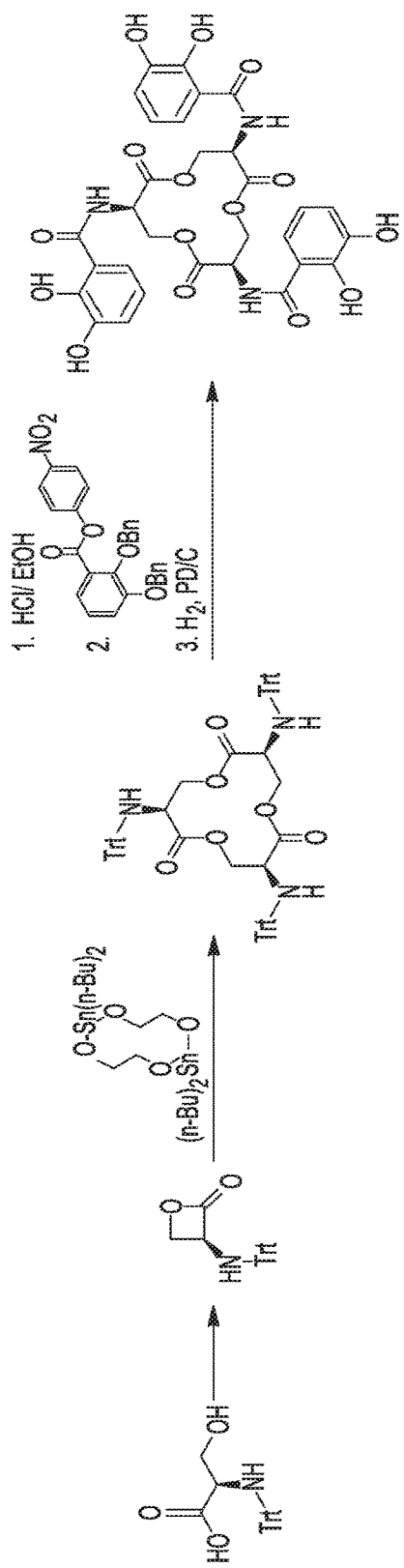
FIG. 2B depicts an example of a reaction scheme for fabricating the TM ion trap additive, employing a synthetic pathway.

FIGS. 2A and 2B each illustrate an example of a method for producing enterobactin. FIG. 2A shows production of enterobactin by a biosynthetic pathway, while FIG. 2B shows production of enterobactin by a synthetic pathway.

As shown in FIG. 2A, the process starts with chorismic acid, an aromatic amino acid precursor. At 100, chorismic acid is converted into isochorismate via isochorismate synthase ($Mg^{2+}$) catalyzed by EntC (enterobactin synthase component C). At 102, the isochorismate is converted into 2,3-dihydro-2,3-dihydroxybenzoate via 2,3-dihydro-2,3-dihydroxybenzoate synthase catalyzed by EntB (enterobactin synthase component B). Reaction 102 results in a pyruvate byproduct 104. At 106, the 2,3-dihydro-2,3-dihydroxybenzoate is converted into 2,3-dihydroxybenzoic acid (DHBA) via 2,3-dihydro-2,3-dihydrobenzoate dehydrogenase catalyzed by EntA, NAD (enterobactin synthase component A). At 108, the amide linkage of DHBA and L-serine 110 is catalyzed by EntD (entrobactin synthase component D), EntE (entrobactin synthase component E), EntF (entrobactin synthase component F), and a C-terminal aryl carrier of EntB, which is a bifunctional protein. Serine is activated by adenylation and subsequently binds onto a peptidyl carrier protein domain of EntF as an acyl-S-pantetheine intermediate. The terminal thioesterase domain of EntF later releases enterobactin after the hydrolysis of three molecules of DHBA-Ser by intermolecular cyclization.

As shown in FIG. 2B, one early synthesis of enterobactin starts with N-trityl-L-serinic acid (or its methyl ester, methyl N-trityl-L-serinate, where trityl (Trt) is the triphenyl methyl group derived from triphenyl methyl chloride). A cyclization reaction produces the serine-β-lactone, and then treatment with 1,1,6,6-tetra-1,6-distanna-2,5,7,10-tetracyclodecane yields the tris(N-trityl-L-serine)trilactone. Then, an acid treatment first yields triserinetrilactonetrihydrochloride, which is further reacted with the p-nitro-phenyl 2,3-di(benzyloxy)benzoate. Deprotection of the catechol groups, accomplished by reduction with hydrogen using a Pd on carbon catalyst, produces enterobactin. Later, improved syntheses eliminate the serine-β-lactone intermediate. The synthesis of enterobactin is reported in the following non-exhaustive list: *PNAS* 100 (7), 3584 (2003) (www.pnas.org/cgi/doi/10.1073/pnas0630018100), *Tetrahedron Lett.* 45, 3919 (1977), *J. Org. Chem.* 46, 3579 (1981), *J. Chem Soc. Chem. Commun.* 15, 846 (1983), *Angew. Chem. Int. Ed. Engl.* 31, 434 (1992), *J. Am. Chem. Soc.* 119, 10093 (1997), *Tetrahedron Lett.* 38, 749 (1997) and *Angew. Chem Int. Ed. Engl.* 32, 477 (1993). A high yield, low-cost preparation of enterobactin for use lithium ion batteries may be desired.

Generalizing, siderophores (Greek: "iron carrier") are small, high-affinity iron chelating compounds secreted by microorganisms such as bacteria, fungi and grasses. Siderophores are among the strongest soluble $Fe^{3+}$ binding agents known. Because the ion size of $Fe^{3+}$ is essentially the same as that of $Mn^{4+}$ and other transition metal cations, siderophores may be advantageously employed in the practice of the teachings herein. A list of such additional siderophores produced by bacteria and fungi that may be used in the practice of these teachings includes:

ferrichrome (*Ustilago sphaerogena*),
mycobactin (*Mycobacterium*),
bacillibactin (*Bacillus subtilis*),
ferrioxamine B (*Streptomyces pilosus*),
fusarinine C (*Fusarium roseum*),
yersiniabactin (*Yersinia pestis*),
vibriobactin (*Vibrio cholerae*),
azotobactin (*Azotobacter vinelandii*),
pseudobactin (*Pseudomonas* B 10),
ornibactin (*Burkholderia cepacia*),
H6-Mecam, and
erythrobactin (*Saccharopolyspora erythraea*).

Naturally occurring materials are considered to be useful in the examples disclosed herein, since they are inexpensive and may be derived from waste water. This may help keep the cost of the battery down. Alternatively, chemically modified or synthetic versions of these naturally occurring materials may alternatively be employed, as partial or total replacement of the naturally occurring materials in the electrolyte solution.

Furthermore, other transition metal ions, e.g., $Mn^{4+}$, $Mn^{3+}$, $Mn^{2+}$, $Fe^{2+}$, and $Fe^{3+}$, are strongly complexed by chemically modifying these naturally occurring transition metal ion traps. In the example provided, enterobactin is allowed to react with sodium hydride to form its sodium salt by reaction with one of the catechol groups, and this is then allowed to react with the pendant benzyl chloride groups on a 30 nm to 70 nm particle of poly(20 wt. %-divinylbenzene-80 wt. %-vinylbenzyl chloride), which itself may be prepared by emulsion polymerization. The enterobatin-modified particle is then used to make improved battery separators useful for trapping metal cations in lithium ion batteries.

There is an increased capture probability of Mn, Ni, and Co cations due to their dispersion in the electrolyte solution when these ion trap materials are used as electrolyte additives. The extraordinary stability of the bactine-transition metal cation complexes and their large molecular masses—as high as 900 a.u.—may be particularly effective in capturing the metal ions in the electrolyte solution and in reducing or preventing their migration through the electrolyte solution, and eventual deposition at the negative electrode 12.

In a first aspect, the nature-made bactine type (i.e., 2,3-dihydroxybenzoic acid-based, or DHBA-based) materials, chemical modifications thereof, or synthetic analogs of DHBA (i.e., the transition metal cation traps)) are used as electrolyte additives to trap transition metal cations leached from the positive electrodes of Li-ion batteries. The additives disclosed and claimed herein may be added to the electrolyte, simply by adding to the electrolyte components. The transition metal cation trap may be present in the electrolyte solution in a concentration within a range of about 1 mM to 100 mM.

In a second aspect, transition metal (TM) chelating polymers containing the transition metal cation traps (e.g., 2,3-dihydroxybenzoic acid groups or salts thereof), may be used to trap transition metal cations in the inter-electrode space of Li-ion batteries and thus prevent their migration to and deposition at the negative electrode 12. Ideally, the ions not only remain in the traps, but do so for the useful life of the battery 10. TM chelating polymers are polymers with chelating agents attached through covalent bonding, either on the polymer main chains, or on the polymer side chains. Examples of the chelators, in addition to those previously listed (e.g., the naturally occurring transition metal cation traps based on 2,3-DHBA), include crown ethers, aza-crown ethers, and iminodiacetic acid salts. Once the ions are trapped, they may stay trapped, and TM deposition on the negative electrode 12 is alleviated or at least reduced.

In this aspect, alternatively, or in addition, the additives may be part of a binder for one or both of the electrodes 12, 14. In some examples, addition of the additive as part of a binder for the positive electrode 14 may be desired. Also alternatively, or in addition, the additives may be part of the separator 16. Still further alternatively, or in addition, the additives may be deposited on a surface of one or both of the electrode 12, 14 and/or on a surface of the separator 16.

The use of the additives as described above may provide a more stable battery, keeping the transition metal cations from moving to the negative electrode 12. The additive traps may result in a doubling of the battery life, partly by helping the formation of an SEI (solid electrolyte interphase), which is ionically conductive and electronically insulating.

Incorporation of TM Chelating Polymer Material into Lithium Ion Battery

Some examples of the lithium ion battery 10 disclosed herein have the TM chelating polymer material incorporated therein. Various examples of how the TM chelating polymer material may be incorporated into the lithium ion battery 10 are shown and described in reference to FIGS. 3A, 3B, 4A, and 4B. In these examples, the TM ion trap is not present in the lithium ion battery as a free molecule.

Figure 3A:
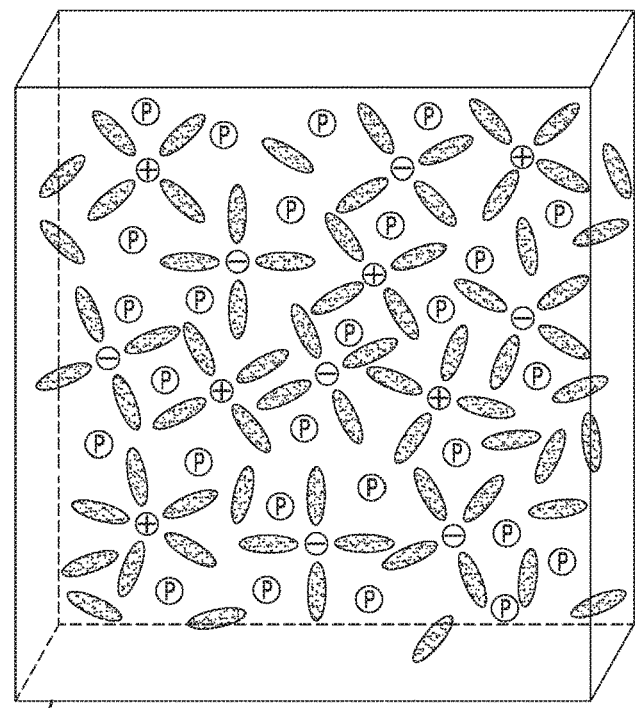
FIG. 3A schematically illustrates an example of a microporous polymer separator of a lithium ion battery including the TM ion trap additive incorporated therein.

In one example, the TM chelating polymer material (identified by the letter P) is incorporated into the microporous polymer separator 16, as shown in FIG. 3A. For instance, the TM chelating polymer material P, which may be present in granular or particle form having an effective diameter, e.g., of about 100 nanometers, is dispersed throughout the membrane of the separator 16. The TM chelating polymer material P may, for instance, be incorporated into the separator 16 during fabrication of the separator 16, such as, e.g., by extrusion or solvent casting. The TM chelating polymer material P may also be incorporated into the separator 16 by mixing the TM chelating polymer material P with the main polymer in the separator 16 formulation. The TM chelating polymer material P may function as the separator 16 when, for example, the TM ion trap is tethered directly to the main polymer in the separator 16. In still another example, the TM chelating polymer material P in granular form may be floating within the electrolyte solution contained inside the separator 16. In yet another example, the TM ion trap of the TM chelating polymer material P may be tethered to a ceramic (e.g., $SiO_2$ or $Al_2O_3$) that is present as a layer on the separator 16 or may be present as a filler within the separator 16.

Figure 3B:
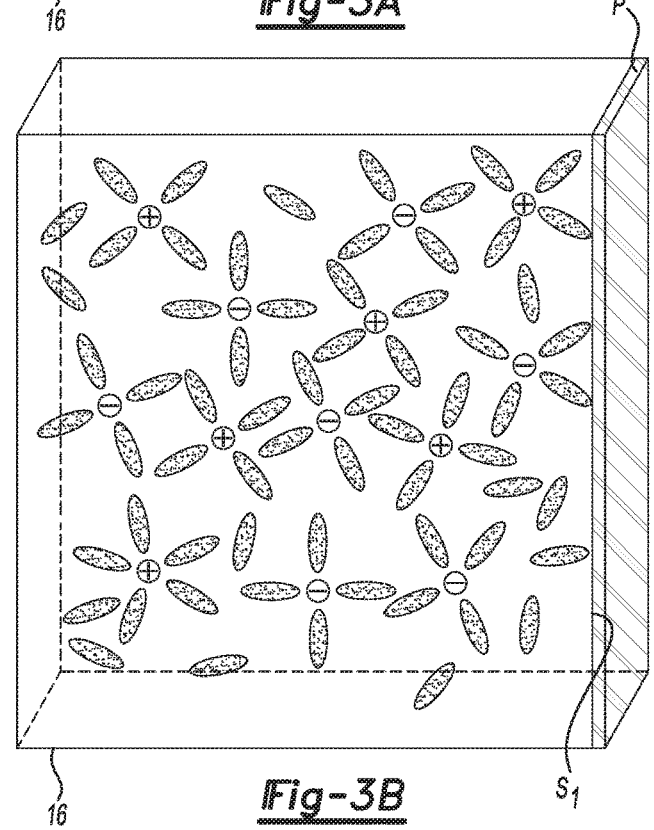
FIG. 3B schematically illustrates another example of the microporous polymer separator including the TM ion trap additive applied to a surface of the separator.

Another example is shown in FIG. 3B, and this example includes applying the TM chelating polymer material P to a surface (e.g., surface $S_1$ as shown in FIG. 3B) of the separator 16. It is to be understood that the TM chelating polymer material P may be applied to a single surface (e.g., $S_1$ as shown in FIG. 3B), or may be applied to two or more surfaces of the separator 16 (e.g., surface $S_1$ and the surface opposed to surface $S_1$). In this example, the TM chelating polymer material P, which may originally be provided in granular form, may be coated (as a thin layer) on the surface $S_1$ of the separator 16, e.g., by dissolving the TM chelating polymer material P in an appropriate solvent, and then applying the solution to the surface $S_1$. The solvent is used to induce the formation of pores in the thin polymer layer. Another method for forming the thin layer of the TM chelating polymer material P includes providing a slurry of the TM chelating polymer material P. The slurry may include the TM chelating polymer material P in the form of insoluble, sub-micron-sized spheres (or some other geometric configuration) in a solvent and binder solution (e.g., PVdF binder in an N-methyl-2-pyrrolidone solvent). The slurry may be deposited onto a pre-existing separator 16 membrane. When the slurry is applied to (or deposited on) the surface $S_1$ of the separator 16, and upon evaporation of the solvent, the binder holds the TM chelating polymer material spheres together and provides adhesion onto the surface $S_1$ as a layer.

Yet other methods of incorporating the TM chelating polymer material P into the separator 16 (either by incorporating the TM chelating polymer material P into the membrane, or by applying the TM chelating polymer material P, as a layer, onto the membrane) includes solvent spraying, painting, dip coating, electrophoretic coating, pressure filtration, electrospinning, compression molding, or combinations thereof. In some cases, plasmas, ion etching and chemical etching with free radicals may also be used to graft the TM chelating polymer material P to the membrane.

As shown in FIGS. 4A and 4B, the TM chelating polymer material P is incorporated into (FIG. 4A), or applied to a surface of (FIG. 4B) the positive electrode 14. It is to be understood that the TM chelating polymer material P may otherwise be incorporated into, or applied to a surface of the negative electrode 12 or both of the negative and positive electrodes 12, 14. These examples, however, are not shown in the figures.

Referring now to FIG. 4A, the TM chelating polymer material P is incorporated into the positive electrode 14. In this example, the TM chelating polymer material P, again which may be present in granular form, is dispersed throughout the bulk of the positive electrode 14 material. The process(es) used to incorporate the TM chelating polymer material P into the separator 16 may also be used to incorporate the TM chelating polymer material P into the positive electrode 14.

As shown in FIG. 4B, the TM chelating polymer material P is applied to a surface (e.g., surface $S_2$ as shown in FIG. 4B) of the positive electrode 14. The process(es) used to apply the TM chelating polymer material P onto a surface of the separator 16 may also be used to apply the TM chelating polymer material P onto a surface of the positive electrode 14. When the TM chelating polymer material P is applied to the surface of the positive electrode 14 (and/or the negative electrode 12), it is to be understood that the surface selected may be the surface that is adjacent to the separator 16.

Transition Metal Chelating Polymer Materials

The TM chelating polymer material P includes the polymer and the TM chelating agent, or TM ion trap, tethered to the polymer. In an example, the polymer may be chosen from any one, or a mixture of any two or more, of the materials identified above for the microporous polymer separator 16. In some instances, the polymer makes up the membrane of the separator 16. In this example, the chelating agent(s) is/are incorporated into the membrane during fabrication of the separator 16. As will be described further below, the polymer may be functionalized to introduce a functional group that the chelating agent can replace or attach to.

In another example, the polymer may be formed from a polymerizable monomer. Some examples of the polymerizable monomer include a vinyl benzene group, such as styrene, vinylbenzyl chloride (i.e., 1-(chloromethyl)-4-vinylbenzene), 1-(chloromethyl-3-vinylbenzene)), divinyl benzene, and the like. The polymerizable monomer may include the TM chelating agent prior to polymerization, or the TM chelating agent may be attached to the polymer formed from polymerization of the monomer.

Other polymers suitable for attaching TM chelating agents include polymers with reactive groups such as epoxy resins and isocyanates (as precursors to urethanes). These polymers have reactive groups that can react with one of the catechol groups of enterobactin. Attachment or blending of TM chelating agents to polymers with reactive functional groups or as inert separator supports has been described previously in U.S. Pat. Nos. 9,130,231, 9,077,038, 9,023,520, 8,785,054, 8,765,301, 8,568,930, and related U.S. Patent Applications 20140242452, 20140072900, 20130183582, 20130071742, 20120082893, 20110165459, and 20110151333, each of which is incorporated herein by reference.

Suitable polymers for blending or tethering TM chelating agents include the following: polyolefins, polyethylene terephthalate, polyvinylidene fluoride, polyamides, polyurethanes, polycarbonates, polyesters, polyetheretherketones, polyethersulfones, polyimides, polyamide-imides, polyethers, polyoxymethylene, polybutylene terephthalate, polyethylenenaphthenate, polybutene, polyolefin copolymers, acrylonitrile-butadiene styrene copolymers, polystyrene copolymers, polymethylmethacrylate, polysiloxane polymers, polybenzimidazole, polybenzoxazole, polyphenylenes, polyarylene ether ketones, polyperfluorocyclobutanes, polytetrafluoroethylene, polyvinylidene fluoride copolymers and terpolymers, polyvinylfluoride, liquid crystalline polymers, polyaramides, polyphenylene oxide, and combinations thereof.

To further illustrate the present disclosure, examples are given herein. It is to be understood that these examples are provided for illustrative purposes and are not to be construed as limiting the scope of the present disclosure.

EXAMPLES

Example 1. Emulsion Polymerization of 80 Wt. % Para-Vinylbenzyl Chloride and 20 Wt. % Divinylbenzene with Potassium Persulfate With the use of a separatory funnel, p-vinylbenzyl chloride (Aldrich, 150 grams) was washed with 0.5 weight percent aqueous sodium hydroxide, and then (the bottom layer) was filtered through a column packed with a short bed of neutral alumina. Divinylbenzene (Sigma-Aldrich, catalog number 414565-1L, 50 grams) was similarly washed with 0.5 weight percent aqueous sodium hydroxide and then (the upper layer) was filtered through a short column packed with neutral alumina. The alumina-treated p-vinylbenzyl chloride (107.66 grams) and divinylbenzene (26.91 grams) were then combined and polymerized in emulsion as follows. De-ionized water was sparged with argon for 30 minutes before use. In a 3-neck, 2-liter, round-bottom flask (situated in an oil bath and equipped with a mechanical stirrer, water-cooled condenser, argon inlet, and sparge tube) was placed 673-mL water, 0.54 g potassium persulfate (Sigma-Aldrich, catalog number 216224-100G), 0.54 g sodium hydrogen phosphate ($Na_2HPO_4$, sodium phosphate dibasic, anhydrous, EM Science, catalog number SX0720-1), and 5.38 g sodium dodecyl sulfate (dodecyl sulfate, sodium salt, Aldrich, catalog number 86,201-0). After this mixture dissolved, the mixture of the alumina-treated, p-vinylbenzyl chloride (107.66 g) and divinylbenzene (26.91 g) was added. After 30 minutes at 23° C. with argon sparging, the sparge tube was replaced with a stopper, and the reaction mixture was stirred at 40° C. for 16 hours, and then at 50° C. for 4 more hours under argon. The emulsion was transferred to partly fill a dialysis membrane tube (Spectra/Por® MWCO: 12-14,000, part number 132680, Spectrum Laboratories, Inc., 120-mm wide, 76-mm diameter) and was then dialyzed for 1 week in a 5-gallon bucket of water with frequent water changes. The dialyzed emulsion was then freeze-dried (using a Labconco Freeze Dry/Shell Freeze System, Freezone 6®) to obtain 103.6 g of white particles (77% yield, with particle sizes between 30 nm and 70 nm in diameter).

Prophetic Example 2. Reaction of Enterobactin with Emulsion Particles of Poly(20 Wt. %-Divinylbenzene-80 Wt. % Para-Vinylbenzyl Chloride)

To a 50-mL glass screw cap jar with a Teflon-faced polyethylene lid is added 1 gram of enterobactin (Sigma, 1.55 mmol), tetrahydrofuran, freshly distilled from sodium benzophenone ketyl (20 g), and a 60 wt. % dispersion of sodium hydride in mineral oil (0.0621 g, 1.55 mmol). After gassing subsides, poly(20 wt. %-divinylbenzene-80 wt. % p-vinylbenzyl chloride) (such as those formed in Example 1, as freeze-dried particles, 1.184 g, 1.55 mmol benzyl chloride groups) and 0.5-mm zirconia beads (30 g) are added. The lid is secured and the jar is roll-milled for at least two weeks. A few drops of methanol are then added, and the dispersion is then transferred to half-fill a dialysis membrane tube (Spectra/Por MWCO: 12-14,000, Spectrum Laboratories, Inc., 1.14-inch diameter) which is then dialyzed for 1 week in a 4-liter beaker of water with frequent water changes. The dialyzed suspension is then freeze-dried (using a Labconco Freeze Dry/Shell Freeze System, Freezone 6®) to obtain 1.5 g (69% yield) of particles (with particle sizes between 30 nm and 70 nm in diameter). The particles, suspended in isopropanol, are then vacuum filtered onto Celgard 2090 porous polyethylene membrane such that the weight ratio of particles to that of the polyethylene membrane is between 1:1 and 2:1. The air-dried membrane is then used as a battery separator in a lithium ion battery.

It is to be understood that the ranges provided herein include the stated range and any value or sub-range within the stated range. For example, a range from about 2.0 volts to about 5.0 volts should be interpreted to include not only the explicitly recited limits of about 2.0 volts to about 5.0 volts, but also to include individual values, such as 3 volts, 4.2 volts, etc., and sub-ranges, such as from about 3.1 volts to about 3.9 volts, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A lithium ion battery, comprising:
   a positive electrode;
   a negative electrode;
   a microporous polymer separator soaked in an electrolyte solution, the microporous polymer separator disposed between the positive electrode and the negative electrode; and
   a transition metal cation trap comprising a siderophore, wherein the transition metal cation trap is tethered to a polymer to form a transition metal chelating polymer material which is deposited as a polymer coating layer onto i) one or more surfaces of any of the positive electrode or the negative electrode or ii) one or more surfaces of the microporous polymer separator, wherein the transition metal chelating polymer material traps and prevents migration of transition metal cations to and deposition thereof at or on the negative electrode, wherein the polymer is selected from the group consisting of polyurethanes, polycarbonates, polyesters, polyetheretherketones, polyethersulfones, polyimides, polyamide-imides, polyoxymethylene, polybutylene terephthalate, polyethylenenaphthenate, polybutene, acrylonitrile-butadiene styrene copolymers, polystyrene copolymers, polymethylmethacrylate, polysiloxane polymers, polybenzimidazole, polybenzoxazole, polyphenylenes, polyarylene ether ketones, polyperfluorocyclobutanes, polytetrafluoroethylene, polyvinylfluoride, liquid crystalline polymers, polyaramides, polyphenylene oxide, and combinations thereof, and the siderophore is a naturally occurring derivative of 2,3-dihydroxybenzoic acid.

2. The lithium ion battery as defined in claim 1, wherein the transition metal cations are selected from the group consisting of $Mn^{4+}$, $Mn^{3+}$, $Mn^{2+}$, $Fe^{2+}$, $Fe^{3+}$, $Cr^{2+}$, $Cr^{3+}$, $Co^{2+}$, $Co^{3+}$, $Ni^{2+}$, $Ni^{3+}$, $Ni^{4+}$, $V^{3+}$, $V^{5+}$, and combinations thereof.

3. The lithium ion battery as defined in claim 1, wherein the transition metal cation trap is also present in the electrolyte solution in a concentration within a range of about 1 mM to 100 mM.

4. A lithium ion battery, comprising:
a positive electrode;
a negative electrode;
a microporous polymer separator soaked in an electrolyte solution, the microporous polymer separator disposed between the positive electrode and the negative electrode; and
a transition metal cation trap comprising a siderophore, wherein the transition metal cation trap is tethered to a polymer to form a transition metal chelating polymer material which is deposited as a polymer coating layer onto i) one or more surfaces of either of the positive electrode or the negative electrode or ii) one or more surfaces of the microporous polymer separator, wherein the transition metal chelating polymer material traps and reduces or prevents migration of transition metal cations to and deposition thereof at or on the negative electrode,
wherein the polymer is selected from the group consisting of polyurethanes, polycarbonates, polyesters, polyetheretherketones, polyethersulfones, polyimides, polyamide-imides, polyoxymethylene, polybutylene terephthalate, polyethylenenaphthenate, polybutene, acrylonitrile-butadiene styrene copolymers, polystyrene copolymers, polymethylmethacrylate, polysiloxane polymers, polybenzimidazole, polybenzoxazole, polyphenylenes, polyarylene ether ketones, polyperfluorocyclobutanes, polytetrafluoroethylene, polyvinylfluoride, liquid crystalline polymers, polyaramides, polyphenylene oxide, and combinations thereof, and the siderophore is selected from the group consisting of bacillibactin, yersiniabactin, vibriobactin, azotobactin, ornibactin, and erythrobactin.

5. The lithium ion battery as defined in claim 4 wherein the transition metal cation trap traps transition metal cations selected from the group consisting of $Mn^{4+}$, $Mn^{3+}$, $Mn^{2+}$, $Fe^{2+}$, $Fe^{3+}$, $Cr^{2+}$, $Cr^{3+}$, $Co^{2+}$, $Co^{3+}$, $Ni^{2+}$, $Ni^{3+}$, $Ni^{4+}$, $V^{3+}$, $V^{5+}$, and combinations thereof.

6. The lithium ion battery as defined in claim 4 wherein the transition metal cation trap is also present in the electrolyte solution in a concentration within a range of about 1 mM to 100 mM.

7. The lithium ion battery as defined in claim 4 wherein the siderophore is selected from the group consisting of yersiniabactin, vibriobactin, azotobactin, ornibactin, and erythrobactin.

8. A method of forming a polymer coating layer within a lithium ion battery, the polymer coating layer comprising a transition metal chelating polymer material, the method comprising:
forming a transition metal cation trap for trapping transition metal cations comprising a siderophore;
replacing a functional group attached to a polymer with the transition metal cation trap, thereby forming the transition metal chelating polymer material having the polymer with a pendant transition metal cation trap comprising the siderophore; and
depositing the transition metal chelating polymer material onto one or more surfaces of either of a positive electrode or a negative electrode of the lithium ion battery, or onto one or more surfaces of a microporous polymer separator of the lithium ion battery to form the polymer coating layer that traps the transition metal cations and reduces or prevents migration thereof,
wherein the polymer is selected from the group consisting of polyurethanes, polycarbonates, polyesters, polyetheretherketones, polyethersulfones, polyimides, polyamide-imides, polyoxymethylene, polybutylene terephthalate, polyethylenenaphthenate, polybutene, acrylonitrile-butadiene styrene copolymers, polystyrene copolymers, polymethylmethacrylate, polysiloxane polymers, polybenzimidazole, polybenzoxazole, polyphenylenes, polyarylene ether ketones, polyperfluorocyclobutanes, polytetrafluoroethylene, polyvinylfluoride, liquid crystalline polymers, polyaramides, polyphenylene oxide, and combinations thereof, and the siderophore is a naturally occurring derivative of 2,3-dihydroxybenzoic acid or is selected from the group consisting of bacillibactin, yersiniabactin, vibriobactin, azotobactin, ornibactin, and erythrobactin.

9. The method as defined in claim 8 wherein the transition metal cations are selected from the group consisting of $Mn^{4+}$, $Mn^{3+}$, $Mn^{2+}$, $Fe^{2+}$, $Fe^{3+}$, $Cr^{2+}$, $Cr^{3+}$, $Co^{2+}$, $Co^{3+}$, $Ni^{2+}$, $Ni^{3+}$, $Ni^{4+}$, $V^{3+}$, $V^{5+}$, and combinations thereof.

10. The method as defined in claim 8 wherein the siderophore is selected from the group consisting of yersiniabactin, vibriobactin, azotobactin, ornibactin, and erythrobactin.

* * * * *